United States Patent Office 3,551,400
Patented Dec. 29, 1970

3,551,400
METHOD FOR MANUFACTURING THE CHLORINATED POLYVINYL CHLORIDE HAVING IMPROVED QUALITY
Shuzo Yonezu, Yasuhiro Nojima, and Takashi Motaki, Osaka, Japan, assignors to Kanegafuchi Chemical Industry Co., Ltd., Osaka, Japan, a corporation of Japan
No Drawing. Filed Dec. 14, 1967, Ser. No. 690,372
Claims priority, application Japan, Jan. 13, 1967, 42/2,528
Int. Cl. C08f 27/03, 3/30
U.S. Cl. 260—92.8                              10 Claims

ABSTRACT OF THE DISCLOSURE

A process for manufacturing the chlorinated polyvinyl chloride characterized in subjecting the chlorinated polyvinyl chloride having gone through the chlorination reaction to reduction before the chlorine dissolved therein or hypochlorous acid which should be introduced by the reaction of chlorine and the water reacts with it.

---

The present invention relates to a method for manufacturing the chlorinated polyvinyl chloride excellent in the heat stability.

The chlorinated polyvinyl chloride (hereinafter referred to as CPVC) are, as is well known, obtained by chlorinating the polyvinyl chloride. This chlorination makes it at the end of the reaction inevitable that a large amount of unreacted chlorine in dissolution is held. Since the dissolved chlorine produces a stimulative odor, and impairs, in many cases, an apparatus containing it, it should be removed by the aftertreatment process, that is, heating or inert gases or alkali treatment.

The CPVC obtained from aforesaid methods is generally poor in its quality, especially, its injection molding being difficult. In other words, the moldable range of temperature of hitherto produced resins are very narrow, and its heat stability is poor (for example, melt moldings made from these resins would give an abnormal coloration which is due upon heat decompostion).

The present inventor has materialized this invention on the knowledge that such defects usually found with conventional resins as those mentioned above are attributable to the dissolved chlorine, and that the result is due to the fact that after the chlorination reaction is completed (that is, when the product is removed from light irradiation), the dissolved chlorine, reacting with water, is converted into hypochlorous acid, which reacts with CPVC, thereby forming carbonyl radicals, double bonds and the like on the resin, and turning it into a readily heat-decomposable resin, and that the measures for removing chlorine are inadequate.

The present invention is essentially characterized in subjecting the CPVC having gone through the chlorination reaction to reduction before the chlorine dissolved in the CPVC or hypochlorous acid which should be introduced by the reaction of chlorine and the water reacts with the CPVC. Its details will follow:

By the raw material CPVC, it is generally meant the chlorinated polyvinyl chloride which is available immediately after the chlorination reaction is completed. Namely, these resins are those existing before the dissolved chlorine turns into hypochlorous acid, and then this acid reacts with the CPVC. The said material always contains, as deemed inevitable in view of the chlorination reaction, chlorine in amounts greater than its saturation at that temperature (for example, 4000 mg./l./50° C.).

The stock polyvinyl chloride, in general, include the resins belonging to the vinyl chloride series. For example, they are vinyl chloride homopolymer, or copolymers of a predominant amount of vinyl chloride and a lesser amount of such materials copolymerizable therewith as olefinic monomers (e.g., propylene, ethylene, etc.) and/or vinyl series monomers of other types (e.g., vinylidene chloride, vinyl acetate, acrylonitrile, acrylic ester, methacrylic acid ester, alkyl vinyl ether), or copolymers and compostions of vinyl chloride contained in a predominant amount and a lesser amount of other compounds (e.g., diene series compounds). These resins may be manufactured by whatever polymerization methods (for example, suspension, emulsion, solution, bulk, or physical mixing).

Any reducing agents will do if only they are capable of reducing chlorine and/or hypochlorous acid to be removed. Whichever type is usable without discrimination, generally, such inorganic compounds as hydrosulfite, thiosulfate, metasulfite, bisulfite, and metal sulfoxides, phosphates, pyrophosphates, etc., stannous chloride, and hydroxylamine hydrochloride, and such organic compounds as, for example, formaldehyde, acetaldehyde, benzaldehyde and other aldehydes, phenol, thiophenol, mercaptane and other phenols, ascorbic acid, organic sulfinic acid, oxalic acid and other organic acids, Grignard reagent and reducing sugar, are employed singly or in combination with more than two of these compounds. The amount to be used should be large enough to reduce the total amount of chlorine and/or hypochlorous acid formed therefrom.

The inert gases should be those that do not cause a chemical change in the chlorine contained, hypochlorous acid or te CPVC, for example, carbon dioxide, air and nitrogen.

First, the dissolved chlorine is driven out by subjecting the raw material CPVC to the usual treatment. For this purpose, the CPVC may be heated to such a temperature (for example, 80° C. under normal pressure) and a period of time (for example, 20 minutes) where it does not denature. Same effect may be achieved by exposing it to the current of inert gases. Of course, the better the effect of driving out the chlorine is, the higher the temperature is, and the longer the treating time is.

What should be kept in mind in performing this treatment is that the treatment should be finished before the hypochlorous acid formed by the reaction of chlorine with water reacts with CPVC. The time required for carrying out it cannot be determined on a common denominator. For the rate of conversion of chlorine into hypochlorous acid is roughly proportional to the temperature used and the length of time spent.

The dissolved amount of chlorine in the CPVC having subjected to this treatment reaches nearly the constant value defined by the temperature of the system. This value, depending on the temperature of the system and other conditions, cannot be set in general terms. However, usually about 25 mg./1.50° C. is usable under the normal pressure. The chlorine is absorbed within the CPVC—or more precisely, it is in mutual dissolution with the CPVC.

The finished material is then subjected to the reduction treatment. The CPVC to be treated is placed under an inert medium, the reducing agent is added in the required amount, that is, the amount large enough to reduce the total amount of the chlorine and/or the hypochlorous acid formed therefrom. The system may be heated arbitrarily. This naturally shortens the time of treatment.

The material having been subjected to this treatment is dehydrated, neutralized and dried, yielding CPVC which is quite excellent in quality.

Some of the effects or advantageous features of this invention are described hereunder:

(1) The intended product obtained in accordance with this invention is very excellent in the heat stability, and does not give an abnormal coloration to the moldings made out of this product.

(2) As compared to the usual method, this method is superior in respect of both the manufacturing operation and the quality of the product made. Of the hitherto used method, the method employing inert gases can, by its own nature, hardly remove all the chlorine contained. The heating of the system is effective in enhancing the removal of chlorine contained to some degree, but the heating is costly, and the moldings become liable to an abnormal coloration. On the other hand, those materials prepared by the neutralization method, that is, the method using neutralizing agents (e.g., sodium hydroxide, sodium carbonate, calcium hydroxide and sodium bicarbonate), are poor in heat stability, and give an abnormal coloration. Through the reaction of the dissolved chlorine with the alkalis mentioned above, hypochlorite is formed. It brings deteriorative effects on the heat stability of the resin.

That these advantageous features are attainable through the exercise of this invention will be manifested by the results of the experiments described in the following table.

TABLE 1.

| Reducing agents | Initial coloration of rolled sheets | Heat stability, (min.) | Injection molding[2] |
|---|---|---|---|
| Experiment No.: | | | |
| 1 ........... Hydroxylamine hydrochloride ..... | Milky white | 215 | Possible. |
| 2 ........... Oxalic acid ........... | do | 200 | Do. |
| 3 ........... Sodium thiosulfate ........... | do | 200 | Do. |
| 4 ........... None ........... | Light yellow | 75 | Impossible (blackened resin mixed in). |
| 5 ........... Hydroxylamine hydrochloride ........... | do | 75 | Do. |
| 6 ........... Caustic soda ........... | do | 75 | Do. |
| 7 ........... Sodium carbonate ........... | do | 75 | Do. |

[1] The heat stability test was conducted by measuring the duration of time elapsed before the sheet is blackened while being heated at 200° C. in the Geer's oven.
[2] Injection test with 2 inch elbow. Temperature, 170 ~ 180° C. Injection pressure, 650 kg./cm².

Note.—Conditions for the experiment 200 parts by weight of polyvinyl chloride obtained through the suspension polymerization, and 800 parts by weight of water were put in and stirred in a hermetically sealed reactor, 50 litres in capacity glass-lined which is equipped with a gas leading pipe, an agitator and a cooler. The mixture was chlorinated to 65% by weight chlorine content under irradiation from a high pressure mercury lamp, while chlorine at 60° C. reaction temperature is being blown in through the gas leading pipe. Then, the irradiation was stopped, and most of the unreacted chlorine was driven out by blowing in air for five minutes. Thereafter, the reducing agents, hydroxylamine hydrochloride 0.1% by weight in Experiment No. 1, oxalic acid 1.0% by weight in No. 2, and sodium thiosulfate 0.1% by weight in No. 3, respectively of the CVPC, were added. The mixture was stirred at 50° C., and left still, thereby getting all the chlorine dissolved therein out, followed by its filtration and water rinsing. Then, caustic soda solution was added to neutralize the mixture, followed by a water rinsing again. The product was dried at 60° C. in an air oven until its volatile content was reduced at about 0.1% by weight.

The CPVC obtained was compounded with a lead type stabilizer, and was rolled at 190° C., thereby preparing test pieces in a sheet form.

Experiments Nos. 4–7 provide the object to be controlled as examples. In case of No. 4, a reducing agent was not added. In case of No. 5, hydroxylamine hydrochloride was added during the process of chlorination. In cases of Nos. 6 and 7, caustic soda and sodium carbonate respectively were added in the amount of 1% by weight of the resin to the systems being chlorinated. These experiments were conducted in the reverse way to that of Experiments Nos. 1–3.

In the following, some examples of the invention will be explained.

EXAMPLE 1

The amount of the dissolved chlorine in the slurry held at the temperature of 65° C., which was made up of CPVC and water immediately after the chlorination reaction was completed, was 2950 mg./l. To the slurry, was added 300 g. of hydroxylamine hydrochloride, followed by its agitation for 30 minutes. Thus, an existence of dissolved chlorine was not recognzied.

The slurry, after having been filtrated and dehydrated, was water-rinsed. Then, the byproduct hydrochloric acid was neutralized with a caustic soda solution, followed by the water rinsing and drying, thereby yielding the product A.

The product obtained was compounded with a lead type stabilizer, and then, was rolled at 190° C. The sheet obtained was subjected to the tests on initial coloration, heat stability and injection moldability. The results are as shown in Table 2.

EXAMPLE 2

The amount of dissolved chlorine in the slurry held at the temperature of 70° C., which was made up of CPVC and water immediately after chlorinating was completed, was 2300 mg./l.

Most of the unreacted chlorine was driven out by blowing in 4 kg./hr. of air into the slurry for 10 minutes. At that time, the amount of chlorine dissolved in the slurry was 18.0 mg./l.

To the slurry, were added 0.1% by weight of hydroxylamine hydrochloride and 0.5% by weight of oxalic acid, followed by the agitation at 60° C. for one hour. Thus, no dissolved chlorine was recognized therein. The slurry was subjected to the same aftertreatment as used in Example 1, thereby yielding the product B. The results are as shown in Table 2.

EXAMPLE 3

Vinyl chloride-propylene copolymer with 3% by weight propylene content (K value: 57) was chosen, and was chlorinated to 64% by weight chlorine content. After the reaction was completed, the temperature of the slurry was 50° C., and the amount of dissolved chlorine was 3900 mg./l.

Most of the unreacted chlorine was driven out by blowing in 7 kg./hr. of air into the slurry for 10 minutes. The amount of dissolved chlorine was 30 mg./l.

Then, 0.5% by weight of sodium thiosulfate was added, followed by the agitation at 50° C. for one hour. No dissolved chlorine was recognized.

The slurry prepared was treated in the same way as that in Example 1, thereby yielding the product C. The results are given in Table 2.

EXAMPLE 4

A polyvinyl chloride was suspended in water, and was chlorinated to 62% by weight chlorine content. After the reaction was completed, the temperature of the slurry was 50° C., and the amount of dissolved chlorine was 3850 mg./l.

Into the slurry was blown in 6 kg./hr. of air for 20 minutes. Thus, the dissolved chlorine became 25 mg./l.

Then, 0.5% by weight of oxalic acid was added, followed its agitation for one hour. No dissolved chlorine was recognized.

By the treatment carried out in the same way as that in Example 1, the product D was obtained. The results as shown in Table 2.

TABLE 2

| Example No.: | Product | Initial coloration of the rolled sheet | Heat stability | Injection molding |
|---|---|---|---|---|
| 1 | A | Milky white | 200 | Possible. |
| 2 | B | do | 210 | Do. |
| 3 | C | do | 180 | Do. |
| 4 | D | do | 215 | Do. |

What is claimed is:

1. A method for manufacturing the chlorinated polyvinyl chloride having improved quality, characterized in that the chlorinated polyvinyl chloride containing unreacted chlorine after having gone through the chlorination reaction are subjected to a reduction before the hypochlorous acid formed through the reaction of chlorine with water reacts with the chlorinated polyvinyl chloride, thereby removing all amount of the chlorine and/or hypochlorous acid contained therein.

2. A method for manufacturing the chlorinated polyvinyl chloride having improved quality, characterized in that the chlorinated polyvinyl chloride which contains unreacted chlorine in the amount above its saturation at that temperature after the chlorination reaction is completed are heated and/or treated under inert gases to reduce their chlorine content to about 25 mg./l./50° C. before the hypochlorous acid formed through reaction of the unreacted chlorine with water reacts with the chlorinated polyvinyl chloride, are subjected to the reduction treatment before the hypochlorous acid reacts with CPVC, thereby removing all amount of the chlorine and/or hypochlorous acid contained therein.

3. Method of manufacturing improved chlorinated polyvinyl chloride, comprising the steps of
    chlorinating polyvinyl chloride, and
    reducing any unreacted chlorine contained in the resulting chlorinated polyvinyl chloride, prior to reaction of hypochlorous acid formed by said unreacted chlorine with water, with said resulting chlorinated polyvinyl chloride.

4. Method of claim 3, further comprising the step of removing said unreacted chlorine following said chlorinating step to lower the chlorine content of said resulting chlorinated polyvinyl chloride to about 25 mg./l./50° C.

5. Method of claim 4, wherein said removing step comprises blowing a predetermined volumne of inert gas into said resulting chlorinated polyvinyl chloride for a predetermined time.

6. Method of claim 4, wherein said removing step comprises heating said resulting chlorinated polyvinyl chloride to a predetermined temperature and for a suitable time.

7. Method according to claim 3, comprising the step of reducing substantially all of said hypochlorous acid prior to reaction thereof with said resulting chlorinated polyvinyl chloride.

8. Method of claim 3, wherein said reducing step comprises mixing of hydroxylamine hydrochloride with said resulting chlorinated polyvinyl chloride.

9. Method of claim 3, wherein said reducing step comprises mixing of sodium thiosulfate with said resulting chlorinated polyvinyl chloride.

10. Method of claim 3, wherein said reducing step comprises mixing of oxalic acid with said resulting chlorinated polyvinyl chloride.

References Cited

UNITED STATES PATENTS

| 2,426,080 | 8/1947 | Champan | 260—92.8A |
| 3,167,535 | 1/1965 | Gateff et al. | 260—92.8A |

JOSEPH L. SCHOFER, Primary Examiner

J. A. DONAHUE, Jr., Assistant Examiner

U.S. Cl. X.R.

260—85.5, 86.3, 87.1, 87.5, 87.7